US012020584B2

(12) United States Patent
Wu et al.

(10) Patent No.: US 12,020,584 B2
(45) Date of Patent: Jun. 25, 2024

(54) SYSTEM AND METHOD FOR MITIGATING AGAINST IONOSPHERIC GRADIENT THREATS FOR AERIAL PLATFORMS

(71) Applicant: Raytheon Company, Waltham, MA (US)

(72) Inventors: Shuwu Wu, Yorba Linda, CA (US); Andrew J. Thomas, Claremont, CA (US); Joseph Chang, Irvine, CA (US)

(73) Assignee: Raytheon Company, Tewksbury, MA (US)

(*) Notice: Subject to any disclaimer, the term of this patent is extended or adjusted under 35 U.S.C. 154(b) by 272 days.

(21) Appl. No.: 17/716,876

(22) Filed: Apr. 8, 2022

(65) Prior Publication Data

US 2023/0326356 A1 Oct. 12, 2023

(51) Int. Cl.
*G08G 5/00* (2006.01)
*G08G 5/02* (2006.01)

(52) U.S. Cl.
CPC ........... *G08G 5/025* (2013.01); *G08G 5/0017* (2013.01); *G08G 5/003* (2013.01); *G08G 5/0091* (2013.01)

(58) Field of Classification Search
None
See application file for complete search history.

(56) References Cited

U.S. PATENT DOCUMENTS 7,089,452 B2 * 8/2006 Rubin ..................... G01S 19/08 701/472
7,253,768 B2 8/2007 van Diggelen et al.
8,154,445 B2 * 4/2012 Maenpa .................. G01S 19/23 342/357.77
8,165,807 B2 4/2012 Garin
9,423,495 B1 * 8/2016 Chang ................. G01S 13/0218
10,324,194 B2 6/2019 Schüttpelz et al.
11,228,469 B1 1/2022 Shpak
2011/0050492 A1 * 3/2011 Um ....................... G01S 19/072 342/357.27
2013/0069822 A1 * 3/2013 Wu ....................... G01S 19/073 342/357.44
2014/0129126 A1 * 5/2014 Richardson .............. G05D 1/00 701/300
2015/0378025 A1 12/2015 Kim et al.
2020/0124742 A1 * 4/2020 Tranchet ................. G01S 19/43
2021/0199812 A1 7/2021 Cheng et al.

* cited by examiner

*Primary Examiner* — James M McPherson

(57) ABSTRACT

A method includes repeatedly determining a distance of an aircraft from a landing location. The method also includes, during a first stage in which the aircraft is at least a threshold distance from the landing location, performing iono-free processing during navigation of the aircraft. The method further includes, during a second stage in which the aircraft is less than the threshold distance from the landing location and a velocity of the aircraft is greater than a velocity threshold, performing divergence-free processing during navigation of the aircraft to address possible ionospheric threats. In addition, the method includes, during a third stage in which the aircraft is less than the threshold distance from the landing location and the velocity of the aircraft is less than the velocity threshold, calculating one or more floor values for a Differential Ionospheric Correction (DIC) sigma, and determining a navigation solution to protect against nominal ionospheric conditions.

20 Claims, 5 Drawing Sheets

SYSTEM AND METHOD FOR MITIGATING AGAINST IONOSPHERIC GRADIENT THREATS FOR AERIAL PLATFORMS

TECHNICAL FIELD

This disclosure is directed in general to navigation systems. More specifically, this disclosure relates to a system and method for mitigating against ionospheric gradient threats for aerial platforms.

BACKGROUND

The use of the Global Positioning System (GPS) or other Global Navigation Satellite System (GNSS) for safety-critical, high-availability air navigation missions can be challenging due to the potential presence of undetected extreme ionospheric conditions. Ionospheric conditions posed a severe challenge during the development of differential GPS navigation systems, such as the Wide Area Augmentation System (WAAS) and the Local Area Augmentation System (LAAS). Without proper mitigation, extreme ionospheric conditions pose threats to GNSS-based navigation safety for both manned and unmanned aerial platforms since they can lead to erroneous range estimates due to mischaracterization of the ionosphere-induced differential signal delays between a reference system and a user. While these extreme ionospheric conditions are rare, requirements for instantaneous high navigation integrity usually lead to very conservative assumptions of their potential presence, even during benign ionospheric conditions.

SUMMARY

This disclosure provides embodiments of a system and method for mitigating against ionospheric gradient threats for aerial platforms.

In a first embodiment, a method includes repeatedly determining a distance of an aircraft from a landing location. The method also includes, during a first stage in which the aircraft is at least a threshold distance from the landing location, performing iono-free processing during navigation of the aircraft. The method further includes, during a second stage in which the aircraft is less than the threshold distance from the landing location and a velocity of the aircraft is greater than a velocity threshold, performing divergence-free processing during navigation of the aircraft to address possible ionospheric threats. In addition, the method includes, during a third stage in which the aircraft is less than the threshold distance from the landing location and the velocity of the aircraft is less than the velocity threshold, calculating one or more floor values for a Differential Ionospheric Correction (DIC) sigma, and using the one or more floor values to determine a navigation solution that protects against threats due to nominal ionospheric conditions.

In a second embodiment, a device includes at least one processor configured to repeatedly determine a distance of an aircraft from a landing location. The at least one processor is also configured, during a first stage in which the aircraft is at least a threshold distance from the landing location, to perform iono-free processing during navigation of the aircraft. The at least one processor is further configured, during a second stage in which the aircraft is less than the threshold distance from the landing location and a velocity of the aircraft is greater than a velocity threshold, to perform divergence-free processing during navigation of the aircraft to address possible ionospheric threats. In addition, the at least one processor is configured, during a third stage in which the aircraft is less than the threshold distance from the landing location and the velocity of the aircraft is less than the velocity threshold, to calculate one or more floor values for a DIC sigma, and use the one or more floor values to determine a navigation solution that protects against threats due to nominal ionospheric conditions.

In a third embodiment, a non-transitory computer readable medium contains instructions that when executed cause at least one processor to repeatedly determine a distance of an aircraft from a landing location. The medium also contains instructions that when executed cause the at least one processor, during a first stage in which the aircraft is at least a threshold distance from the landing location, to perform iono-free processing during navigation of the aircraft. The medium further contains instructions that when executed cause the at least one processor, during a second stage in which the aircraft is less than the threshold distance from the landing location and a velocity of the aircraft is greater than a velocity threshold, to perform divergence-free processing during navigation of the aircraft to address possible ionospheric threats. In addition, the medium contains instructions that when executed cause the at least one processor, during a third stage in which the aircraft is less than the threshold distance from the landing location and the velocity of the aircraft is less than the velocity threshold, to calculate one or more floor values for a DIC sigma, and use the one or more floor values to determine a navigation solution that protects against threats due to nominal ionospheric conditions.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
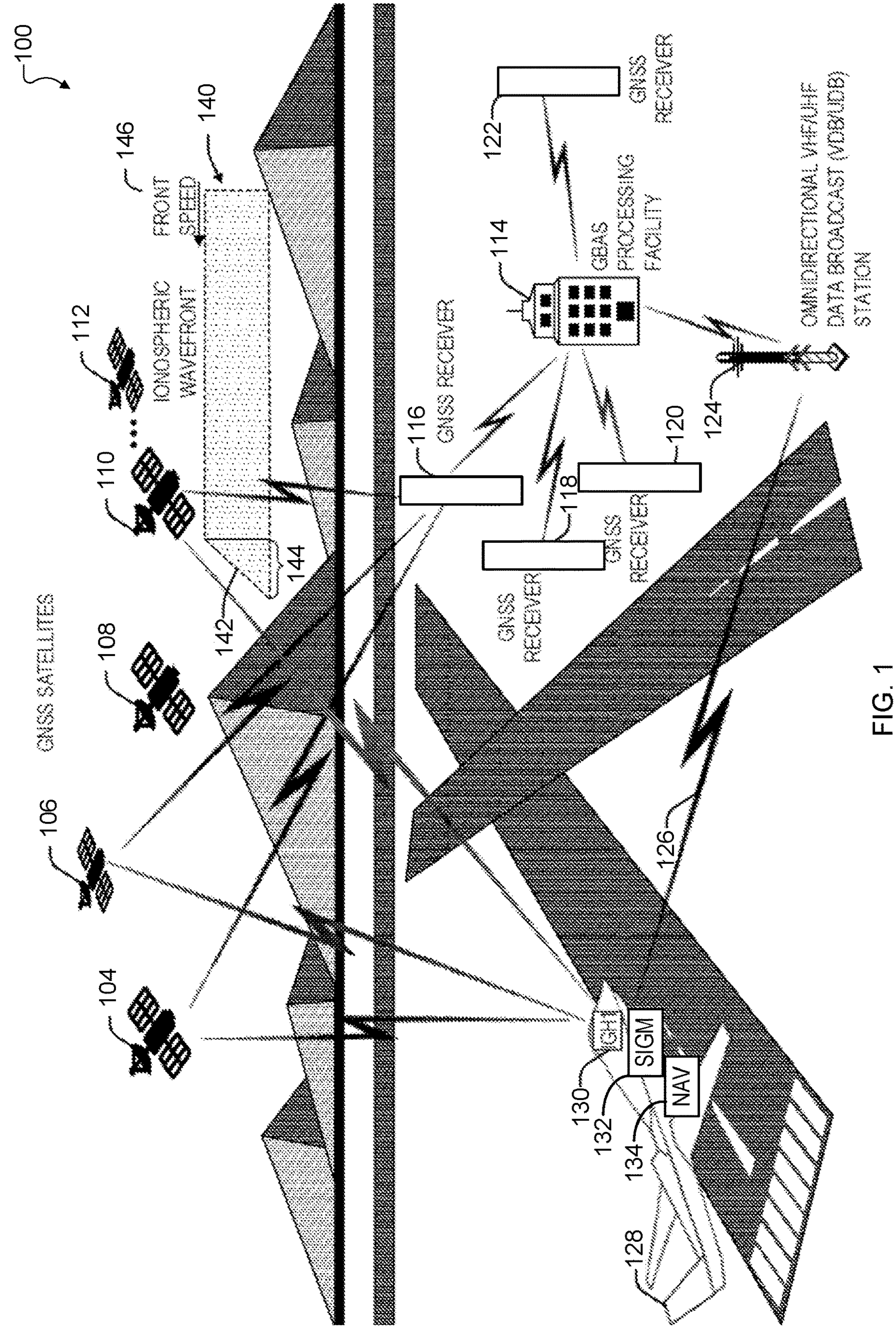
FIG. 1 illustrates an example system for processing geospatial positioning data according to this disclosure.

FIGS. 1 through 5, described below, and the various embodiments used to describe the principles of the present disclosure in this patent document are by way of illustration only and should not be construed in any way to limit the scope of the disclosure. Those skilled in the art will understand that the principles of the present disclosure may be implemented in any type of suitably arranged device or system.

For simplicity and clarity, some features and components are not explicitly shown in every figure, including those illustrated in connection with other figures. It will be understood that all features illustrated in the figures may be employed in any of the embodiments described. Omission of a feature or component from a particular figure is for purposes of simplicity and clarity and is not meant to imply that the feature or component cannot be employed in the embodiments described in connection with that figure. It will be understood that embodiments of this disclosure may include any one, more than one, or all of the features described here. Also, embodiments of this disclosure may additionally or alternatively include other features not listed here.

As discussed above, the use of the Global Positioning System (GPS) or other Global Navigation Satellite System (GNSS) for safety-critical, high-availability air navigation missions can be challenging due to the potential presence of undetected extreme ionospheric conditions. Ionospheric conditions posed a severe challenge during the development of differential GPS navigation systems, such as the Wide Area Augmentation System (WAAS) and the Local Area Augmentation System (LAAS). Without proper mitigation, extreme ionospheric conditions pose threats to GNSS-based navigation safety for both manned and unmanned aerial platforms since they can lead to erroneous range estimates due to mischaracterization of the ionosphere-induced differential signal delays between a reference system and a user. While these extreme ionospheric conditions are rare, requirements for instantaneous high navigation integrity usually lead to very conservative assumptions of their potential presence, even during benign ionospheric conditions. For example, without proper detection, loss of navigation integrity may result; without proper mitigation, poor navigation service availability may result. The ionosphere is often the most significant factor constraining integrity and availability performance to safety-of-life GNSS-based navigation.

Existing solutions for mitigating severe ionospheric gradient threats in WAAS and LAAS do not meet the more stringent requirements for sea-based automatic landing or for land-based CAT-III (or equivalent) automatic landing, both of which have very tight integrity alert limits (such as a Vertical Alert Limit (VAL) of about 4.0 meters for automatic landing, a VAL of 10 meters (at about 0.5 nautical miles) for CAT-I Precision Approach (PA), a VAL of 20 meters for APV-II, a VAL of 35 meters for LPV200, and a VAL of 50 meters for LPV/APV-I). Mitigating against severe ionospheric threats remains a significant challenge to the integrity and availability for automatic landing systems or for systems requiring high-integrity Real Time Kinematic (RTK) solutions.

Previous ionospheric gradient monitoring techniques rely on an aerial platform maintaining a constant relative velocity above a given threshold to properly observe the spatial ionospheric gradient. This is appropriate for a fixed-wing aerial platform performing a runway landing. However, these techniques are not applicable for other aerial platforms, such as those with variable approach speeds like helicopters, vertical and/or short take-off and landing (VSTOL) aircraft, or drones. For these aerial platforms, the relative velocities can converge to zero as they approach a landing or hover point. Therefore, a new approach is needed to mitigate spatial ionosphere threats for aerial platforms with variable approach speeds. Without an effective solution, sea- or land-based automatic landing systems cannot achieve operationally required integrity and service availability while ensuring navigation safety.

This disclosure provides embodiments of a system and method for mitigating against ionospheric gradient threats for aerial platforms. Among other things, the disclosed embodiments improve the performance of spatial ionosphere gradient monitoring for aerial platforms with a relative velocity above a threshold necessary to observe a spatial ionospheric gradient. Also, the disclosed embodiments maintains safety against ionospheric gradient threats for variable-speed aerial platforms with a relative velocity below the threshold necessary to observe a spatial ionospheric gradient. In addition, the disclosed embodiments can protect when the receiver reference point is up to twenty nautical miles away from touchdown. In some embodiments, the disclosed systems and methods can be used for a number of commercial or defense-related applications, such as commercial or defense-related helicopters, drones, or other aerial vehicles. While not specifically listed here, any other suitable applications are within the scope of this disclosure.

FIG. 1 illustrates an example system 100 for processing geospatial positioning data according to this disclosure. In some embodiments, the system 100 can include or be part of a Local Area Augmentation System (LAAS), a Ground Based Augmentation System (GBAS), or a sea-based Precision Approach and Landing System (PALS). However, the system 100 can include or be a part of any other suitable system(s). As shown in FIG. 1, the system 100 includes a plurality of reference receivers 116-122, which may be located in an area around an airport or another suitable location. The reference receivers 116-122 are configured to receive geospatial positioning data from GNSS satellites 104-112, which are configured to generate or otherwise provide geospatial positioning data.

The reference receivers 116-122 send measurements to a processing facility 114, which uses these measurements to formulate differential corrections and error bounds for the GNSS satellites 104-112, which are tracked by the reference receivers 116-122. Each of the reference receivers 116-122 may be precisely surveyed, enabling the processing facility 114 to determine errors in geospatial positioning signals being received from the GNSS satellites 104-112 by the reference receivers 116-122. Satellite and receiver measurements can be monitored for potential faults, and measurements with detected faults can be removed from the differential corrections. The processing facility 114 transmits these differential corrections, error bounds, ranging measurements, and other approach guidance information to a rover, such as an aircraft 128, via any suitable technique. In some cases, the information can be transmitted using a VHF Data Broadcast (VDB) or UHF Data Broadcast (UDB) 126 transmitted by a VDB/UDB station 124.

In some embodiments, the aircraft 128 can include an Ionospheric Gradient H1 (IGH1) monitor 130 and a spatial ionospheric gradient monitor (IGM) 132. The IGH1 monitor 130 is configured for protection of a main navigation system 134, and the term "H1" refers to a navigation system that supplements or extends the main (or "H0") navigation system 134 by accounting for the possibility of one failure case and mitigating it, in this case the existence of a severe ionospheric front that has not been detected via other means. The IGH1 monitor 130 and the spatial IGM 132 are configured to use data from the GNSS satellites 104-112, as well as the VDB/UDB 126 from the VDB/UDB station 124, to perform one or more of the techniques discussed below for maintaining integrity and protecting the main navigation system 134 against ionospheric threats, such as an ionospheric gradient front 140. The ionospheric gradient front 140 can be modeled as a linear semi-infinite wedge with a slope 142, a width 144, and a front speed 146. As illustrated in FIG. 1, the ionospheric gradient front 140 can affect the measurements transmitted by multiple satellites, such as satellites 104-112. The ionospheric gradient front 140 can affect the GNSS satellite signals by delaying the propagation of the modulation (such as group delay) and, in some regions, by causing rapid fluctuations in the power and phase of the received signal (such as scintillation effects).

In some cases, severe ionospheric gradients when present may only simultaneously affect a subset (N) of the total (M) satellites 104-112 in view. In particular instances, the maximum number of simultaneously-impacted satellites is, for example, N=2, which may be established by expert consensus. Therefore, it could be assumed that no more than N=2 of the satellites 104-112 in view are impacted simultaneously by an extreme gradient front such as the ionospheric gradient front 140. For the remaining satellites, nominal ionospheric conditions could be assumed. This assumption is particularly applicable when the aircraft 128 is landing with reference receivers 116-122 that are close to (such as less than 3 km away from) a touchdown point.

In some embodiments, using the IGH1 monitor 130 and the spatial IGM 132 in connection with the techniques discussed below provides a high integrity RTK solution or a divergence-free carrier-smoothed-code (float) solution without overly conservative ionospheric gradient uncertainty for the main navigation system 134. This ensures high or sufficient accuracy for navigation purposes like catching the correct wire on an aircraft carrier or automatic landing on a fixed runway. The IGH1 monitor 130 and the spatial IGM 132, however, also provide high integrity against severe ionospheric gradient threats for the main navigation system 134. The IGH1 monitor 130 and the spatial IGM 132 include any suitable hardware or hardware and firmware/software instructions to maintain integrity and protect the main navigation system 134 against ionospheric threats.

Although FIG. 1 illustrates one example of a system 100 for processing geospatial positioning data, various changes may be made to FIG. 1. For example, the system 100 may include any number of satellites 104-112 or reference receivers 116-122. Also, various components in the system 100 may be combined, further subdivided, replicated, rearranged, or omitted and additional components may be added according to particular needs. In addition, while FIG. 1 illustrates one example operational environment in which geospatial positioning data can be processed, this functionality may be used in any other suitable system.

Figure 2:
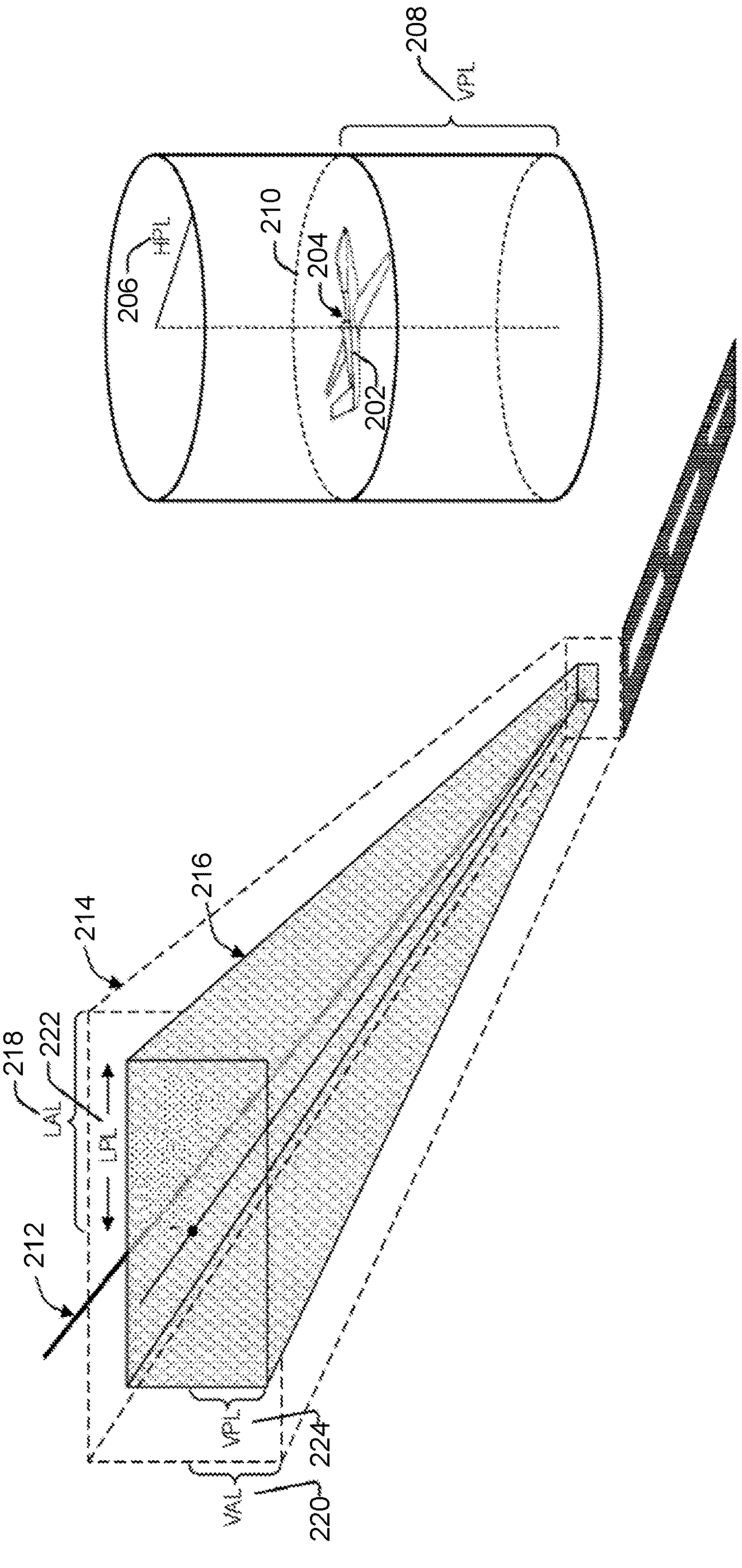
FIG. 2 illustrates example protection levels that can be part of a protection level (PL) set used for protecting a navigation system according to this disclosure.

In some embodiments, different protection levels (PLs) may be calculated as part of one or more PL sets in connection with protecting and maintaining the integrity of a navigation system (e.g., the main navigation system 134). FIG. 2 illustrates a diagram 200 of example PLs that can be part of a PL set used for protecting a navigation system according to this disclosure. As shown in FIG. 2, the diagram 200 depicts an aircraft 202, which may represent or be represented by the aircraft 128 of FIG. 1. The aircraft 202 may have a desired position 204 on an ideal approach path. The aircraft 202 can be associated with multiple PLs, including a horizontal protection level (HPL) 206 and a vertical protection level (VPL) 208, which can be used in connection with forming a final PL set that protects the navigation system in accordance with some embodiments of this disclosure. As used here, the HPL 206 is the radius of a circle in a horizontal plane 210 with its center being on the desired position 204, which describes the region that is assumed to contain an indicated horizontal position of the aircraft 202. The VPL 208 is half the length of a segment on the vertical axis (perpendicular to the horizontal plane 210), with its center being at the desired position 204. The VPL 208 describes the region that is assumed to contain an indicated vertical position of the aircraft 202.

The diagram 200 further depicts an alert limit tunnel 214 and a protection level tunnel 216 with a defined path 212, such as a defined path for the aircraft 202 to follow until touchdown. The alert limit tunnel 214 is associated with a lateral alert limit (LAL) 218 and a vertical alert limit (VAL) 220. The alert limit associated with the horizontal direction is a horizontal alert limit (HAL). The protection level tunnel 216 is also associated with a lateral protection level (LPL) 222 and a VPL 224 as illustrated in FIG. 2. An LPL is defined as the integrity bound in the lateral direction on the horizontal plane and perpendicular to the defined path 212. In aspects associated with precision approach and landing, a PL set can include the VPL 224 and the LPL 222. In aspects associated with enroute navigation, a PL set can include the HPL 206. The PL set defines a region within which an aircraft is truly contained with a high level of certainty, such as a 99.99999% (referred to as "seven 9s") probability.

Although FIG. 2 illustrates one example of PLs that can be part of a PL set, various changes may be made to FIG. 2. For example, a PL set could include other combinations of PLs, and FIG. 2 does not limit this disclosure to any particular arrangement or combination.

Figure 3:
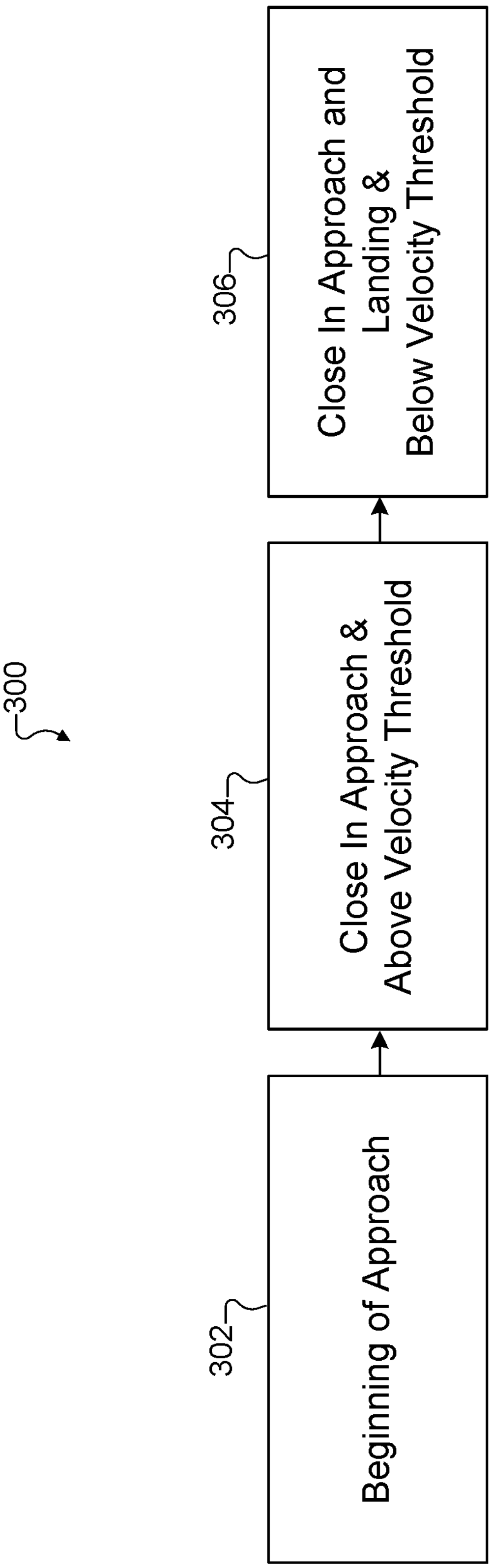
FIG. 3 illustrates an example process for ionospheric threat mitigation for precision approach and landing according to this disclosure.

FIG. 3 illustrates an example process 300 for ionospheric threat mitigation for precision approach and landing according to this disclosure. The process 300 provides end-to-end navigation solution protection as a variable speed aerial platform approaches touchdown. For ease of explanation, the process 300 is described as being performed using the IGH1 monitor 130 in the system 100 of FIG. 1. However, the process 300 may involve the use of any suitable device(s) in any suitable system(s).

As shown in FIG. 3, the process 300 includes a first stage 302, a second stage 304, and a third stage 306. The various stages 302-306 depend on the distance of the aircraft 128 from its landing location, so the main navigation system 134 or the spatial IGM 132 repeatedly determines the distance of the aircraft 128 from its landing location while the aircraft 128 makes its approach. In the first stage 302, the main navigation system 134 utilizes an iono-free measurement combination to mitigate ionospheric threats. In the second stage 304, the aircraft 128 is closer to touchdown, and the main navigation system 134 uses the spatial IGM 132 in a divergence-free measurement combination to provide a more accurate precision navigation system. Thus, the main navigation system 134 utilizes both divergence-free and iono-free processing to enhance the performance of the main navigation system 134. In the third stage 306, the aircraft 128 is close to landing and has a velocity below a minimum threshold, and the IGH1 monitor 130, together with one or more floor values for spatial Differential Ionospheric Correction (DIC) sigmas, accounts for the loss of observability of the spatial ionospheric gradient for aerial platform speeds below the minimum threshold. The transitions between the stages 302-206 are seamless with respect to the navigation and the protection levels of the aircraft 128 and provide maximum availability during each stage 302-306. These stages 302-206 will now be described in greater detail.

First Stage 302: Beginning of Approach

Generally, when the aircraft 128 is at least a specified threshold distance from a ship, ground station, or other system providing a landing location (such as greater than approximately 3 km away, although other distances are possible and within the scope of this disclosure), less-precise relative navigation accuracy is typically acceptable, and iono-free processing can be performed to form a relative navigation system between the ship, ground station, or other system and the aircraft 128. One example of this type of iono-free processing is described in U.S. patent application Ser. No. 16/705,578 (U.S. Patent Publication No. 2021/0173090), which is hereby incorporated by reference in its entirety.

Iono-free processing can substantially or completely address (to first order) the ionosphere-induced effects in the relative ranging solution, but it may result in increased navigation error when compared to using divergence-free processing. Using iono-free processing, the spatial IGM 132 can calculate iono-free pseudo-range and carrier phase observables can be calculated using raw pseudo-range and carrier phase measurements from the reference receivers 116-122 based on the following logic. The pseudo-range and carrier phase observables free of the effects of ionospheric error (to first order) can also be referred to as the iono-free pseudo-range observables and the iono-free carrier phase observables, respectively. For a given satellite i, frequency y, and receiver m, the iono-free pseudo-range observables ($\rho_{y,IF,m}{}^{i}$) and iono-free carrier phase observables ($\Phi_{y,IF,m}{}^{i}$) may be defined as in the following equations, which assume the inverse-square model of the ionosphere. Signal frequencies L1 and L2 are used here for examples.

$$\rho^i_{L1,IF,m} = \rho^i_{L1,m} + K_{L1}(\rho^i_{L1,m} - \rho^i_{L2,m}) = (1 + K_{L1})\rho^i_{L1,m} + (-K_{L1})\rho^i_{L2,m}$$

$$\rho^i_{L2,IF,m} = \rho^i_{L2,m} + K_{L2}(\rho^i_{L1,m} - \rho^i_{L2,m}) = (K_{L2})\rho^i_{L1,m} + (1 - K_{L2})\rho^i_{L2,m}$$

$$\Phi^i_{L1,IF,m} = \Phi^i_{L1,m} + K_{L1}(\Phi^i_{L1,m} - \Phi^i_{L2,m}) = (1 + K_{L1})\Phi^i_{L1,m} + (-K_{L1})\Phi^i_{L2,m}$$

$$\Phi^i_{L2,IF,m} = \Phi^i_{L2,m} + K_{L2}(\Phi^i_{L1,m} - \Phi^i_{L2,m}) = (K_{L2})\Phi^i_{L1,m} + (1 - K_{L2})\Phi^i_{L2,m}$$

$$\text{where } K_{L1} = \frac{f_2^2}{f_2^2 - f_1^2} \text{ and } K_{L2} = \frac{f_1^2}{f_2^2 - f_1^2} = K_{L1} + 1.$$

The iono-free processing of the first stage 302 may result in increased navigation error when compared to using divergence-free processing. Thus, as the aircraft 128 gets closer to the ship, ground station, or other system and is less than the threshold distance (such as less than approximately 3 km away, although other distances are possible and within the scope of this disclosure), the spatial IGM 132 transitions to the second stage 304 and uses divergence-free processing to develop a robust more-accurate relative navigation system with tighter protection level bounds.

Second Stage 304: Close in Approach and Above Velocity Threshold

As discussed above, as the aircraft 128 moves within the threshold distance from the landing location, the IGH1 monitor 130 transitions to performing divergence-free processing in the spatial ionosphere gradient monitoring. Some conventional divergence-free processing techniques use fixed values for spatial ionosphere gradient monitoring parameters, such as buffer sample rate and buffer size. These techniques do not optimize monitor performance for variable or constant approach speeds or maintain the observed ionospheric gradient distance. However, for a given relative aerial platform velocity, there is flexibility in how the spatial ionosphere gradient monitoring parameters can be chosen, and they can vary epoch to epoch. To take advantage of this flexibility, the spatial IGM 132 may use a novel technique for selecting the parameters to optimize the performance of the spatial IGM 132 and mitigate the ionospheric threat while avoiding conservative over-inflation and computation load. The selection technique used by the spatial IGM 132 extends the utility of the spatial IGM 132 to scenarios where the aircraft 128 exhibits variable approach speeds.

The spatial IGM 132 checks for large spatial gradients and deviations from linearity directly using carrier phase measurements from both the ship, ground station, or other system and air. The spatial IGM 132 also checks the spatial gradient by comparing the carrier phase ionospheric gradient to the pseudo-range ionospheric gradient for consistency as an integrity check. The spatial IGM 132 outputs a spatial Differential Ionospheric Correction (DIC) and an appropriate integrity bounding DIC sigma that are used for satellites that have passed ionospheric gradient monitoring for potential use in computing the relative navigation position solution with divergence-free measurements. Note that DICs are the differential corrections between aircraft and reference navigation measurements based on estimated differential ionospheric delays, and DIC sigmas are the uncertainties associated with differential ionospheric delay estimates. The observability of the ionospheric gradient is dependent on the time differential, and on approach the gradient necessarily gets smaller as the aircraft reaches touchdown. This change in ionospheric delay in the ranging measurements during approach can be handled using a data buffer for the system reference and aircraft ionosphere measurements to provide a robust estimation of the underlying spatial ionospheric gradient. The resultant DIC sigma can depend on the buffer size and buffer sample rate.

In the process 300, the spatial IGM 132 may use a partitioning scheme based on the approach speed of the aircraft 128 to determine the buffer size and buffer sample rate. During the second stage 304, to observe a spatial ionospheric gradient, the relative aerial platform velocity is above a certain velocity threshold. The velocity threshold represents the minimum aircraft velocity needed to observe a spatial ionospheric gradient. For variable speeds above this threshold, the spatial IGM 132 may select the buffer sample rate and buffer size to satisfy the following equation, where D is the minimum distance over which a spatial ionospheric gradient can be observed:

Relative_aircraft_velocity*Buffer_Sample_Rate*Buffer_Size=*D*.

The partitioning takes into account that the buffer sample rate is a multiple of the data rate processing speed, and varying the sample rate has little effect on the DIC sigma. The partitioning can also take into account that the buffer size is a positive integer above a minimum threshold, below which the DIC sigma performance degrades.

Some examples are presented for clarification. Suppose an ionospheric gradient can be observed over a 1.8 km (1800 m) distance. For an aerial platform relative velocity of 60 m/s, the buffer sample rate and buffer size can be the following:

Buffer_Sample_Rate=0.5 sec

Buffer_Size=60

Relative_aircraft_velocity*Buffer_Sample_Rate*Buffer_Size=1800 m.

For an aerial platform relative velocity of 40 m/s, the buffer sample rate and buffer size can be the following:

Buffer_Sample_Rate=1.0 sec

Buffer_Size=45

$$\text{Relative\_aircraft\_velocity*Buffer\_Sample\_Rate*Buffer\_Size}=1800 \text{ m.}$$

For an aerial platform relative velocity of 33 m/s, the buffer sample rate and buffer size can be the following:

$$\text{Buffer\_Sample\_Rate}=1.0 \text{ sec}$$

$$\text{Buffer\_Size}=55$$

$$\text{Relative\_aircraft\_velocity*Buffer\_Sample\_Rate*Buffer\_Size}=1815 \text{ m.}$$

For this last example, the observed gradient is 15 m larger than the observable distance of 1.8 km. For this algorithm, the observed gradient equation may be larger than or equal to the minimum observable distance D to avoid underestimating the ionospheric gradient.

Third Stage 306: Close In Approach/Landing and Below Velocity Threshold

In this stage, the approach speed of the aircraft 128 can fall below a specified velocity threshold. This is because certain aircraft types, such as helicopters, VSTOL, and drones, may have their speed decrease to zero or close to as they approach hover or landing locations. Below the velocity threshold, the spatial IGM 132 may have poor observability of the spatial ionospheric gradient, and the techniques described in the first stage 302 and the second stage 304 may be unable to mitigate ionospheric threats. In particular, the DIC estimations may not be reliable for aerial platform speeds below the velocity threshold.

To mitigate ionospheric gradient threats when the aerial platform approach speed falls below the velocity threshold, one or more floor values for the DIC sigma in the IGH1 monitor 130 can be introduced. The floor values, used in conjunction with the IGH1 monitor 130, protect the main navigation system 134 from ionospheric gradient threats, provide high integrity RTK solutions, and ensure sufficient accuracy for relative aerial platform velocities below the velocity threshold. The floor values for the DIC sigma can be defined as follows:

$$\sigma_{DIC\_floor}=\alpha * f(DFT)+\beta$$

where $\alpha$ is the ionospheric gradient estimation, $\beta$ is the floor value of the vertical DIC sigma, and f is a function that decreases as the horizontal distance from touchdown (DFT) approaches the minimum DFT value.

In some embodiments, the floor values are assumed to provide protection during nominal ionospheric conditions and are not meant to mitigate severe ionospheric threats. To provide protection during severe ionospheric threats when gradient observability is poor, the IGH1 monitor 130 can calculate a navigation solution based on a set of protection levels. The IGH1 monitor 130 may consider all physically-possible scenarios of N satellites of M total satellites that could be simultaneously impacted by a severe ionospheric gradient front and can protect (to the specified integrity level) against the threat. For each of the multiple ionospheric hypothesized gradient threat scenarios defined by a specific subset of N-impacted satellites, the IGH1 monitor 130 computes a supplemental navigation solution (such as a float or Carrier-Smoothed-Code solution), called the H1 solution, and its corresponding set of integrity protection levels, called Ionospheric Gradient H1 protection levels. This can be done, for example, by using nominal and conservatively-safe ionospheric gradient uncertainties (determined to the specified integrity risk levels) for unimpacted and impacted satellites, respectively.

Consequently, each measurement combination's H1 solution PLs adequately protects the associated H1 solution for the given hypothesized threat scenario. Adding the solution to the H1 solution PLs provides an individual ionospheric gradient H1 PL set (VPL/LPL/HPL) that protects the main navigation system 134 for this hypothesized threat scenario. The individual ionospheric gradient H1 PL set includes the maximum of individual ionospheric gradient H1 PLs over all physically possible threat scenarios. This H1 PL set provides protection for the main navigation system 134 during severe ionospheric gradient threats up to the specified integrity risk allocation.

Therefore, when the relative aerial platform velocity is too low to provide adequate ionospheric gradient observability, the assumed floor values provide protection to the main navigation system 134 during nominal ionospheric threats, and the ionospheric gradient H1 PL set provides protection during severe ionospheric threats. This demonstrates an end-to-end navigation solution that is protected from ionospheric threats as a variable-speed aerial platform approaches touchdown, such as up to twenty nautical miles away from a reference receiver. Moreover, the end-to-end navigation solution can be protected from ionospheric conditions regardless of the approach speed.

As discussed above, the embodiments disclosed here, including support for variable speeds and providing integrity when the ionospheric gradient observability is poor, solves a critical integrity problem in sea-based approach and landing systems, land-based (fixed site or mobile) automatic landing of unmanned aerial vehicles, civil CAT-III operations, or other operations. The disclosed embodiments meet the CAT-I (10 m VAL) or more stringent CAT-III or autoland (~4 m VAL) requirements during severe ionosphere gradient conditions for variable-speed aerial platforms. The disclosed embodiments also mitigate ionospheric threat conditions for land-based approach and landing systems when operating a base station remote from runways.

Although FIG. 3 illustrates one example of a process 300 for ionospheric threat mitigation for precision approach and landing, various changes may be made to FIG. 3. For example, while shown as a series of steps, various steps in FIG. 3 may overlap, occur in parallel, occur in a different order, or occur any number of times.

Figure 4:
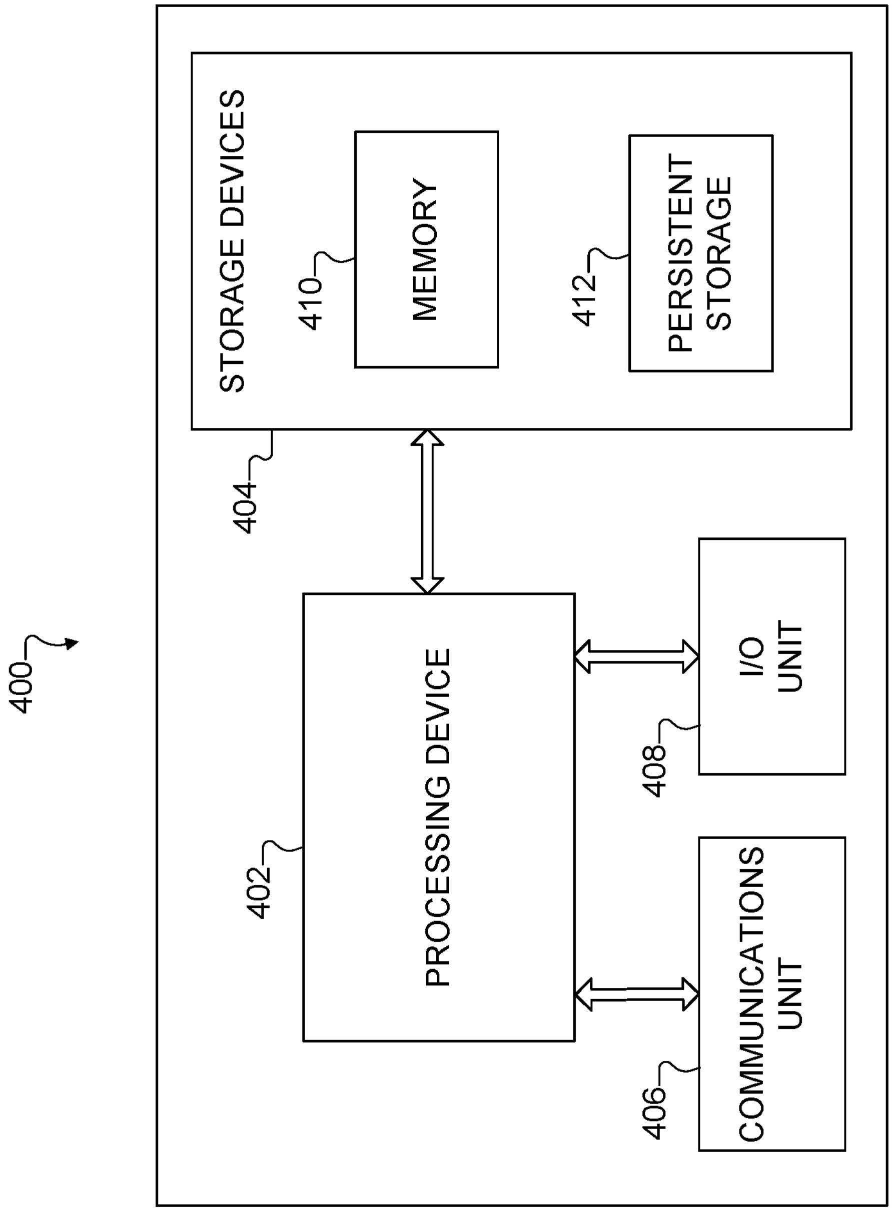
FIG. 4 illustrates an example device for ionospheric threat mitigation for precision approach and landing according to this disclosure.

FIG. 4 illustrates an example device 400 for ionospheric threat mitigation for precision approach and landing according to this disclosure. One or more instances of the device 400 may, for example, be used to at least partially implement the functionality of the IGH1 monitor 130 of FIG. 1. However, the functionality of the IGH1 monitor 130 may be implemented in any other suitable manner.

As shown in FIG. 4, the device 400 denotes a computing device or system that includes at least one processing device 402, at least one storage device 404, at least one communications unit 406, and at least one input/output (I/O) unit 408. The processing device 402 may execute instructions that can be loaded into a memory 410. The processing device 402 includes any suitable number(s) and type(s) of processors or other devices in any suitable arrangement. Example types of processing devices 402 include one or more microprocessors, microcontrollers, digital signal processors (DSPs), application specific integrated circuits (ASICs), field programmable gate arrays (FPGAs), or discrete circuitry.

The memory 410 and a persistent storage 412 are examples of storage devices 404, which represent any structure(s) capable of storing and facilitating retrieval of information (such as data, program code, and/or other suitable information on a temporary or permanent basis). The memory 410 may represent a random access memory or any other suitable volatile or non-volatile storage device(s). The persistent storage 412 may contain one or more components or devices supporting longer-term storage of data, such as a read only memory, hard drive, Flash memory, or optical disc.

The communications unit 406 supports communications with other systems or devices. For example, the communications unit 406 can include a network interface card or a wireless transceiver facilitating communications over a wired or wireless network. The communications unit 406 may support communications through any suitable physical or wireless communication link(s).

The I/O unit 408 allows for input and output of data. For example, the I/O unit 408 may provide a connection for user input through a keyboard, mouse, keypad, touchscreen, or other suitable input device. The I/O unit 408 may also send output to a display or other suitable output device. Note, however, that the I/O unit 408 may be omitted if the device 400 does not require local I/O, such as when the device 400 can be accessed remotely.

In some embodiments, the instructions executed by the processing device 402 can include instructions that implement the functionality of the main navigation system 134, the IGH1 monitor 130, and the spatial IGM 132. For example, the instructions executed by the processing device 402 can include instructions for mitigating ionospheric threats for precision approach and landing as described above.

Although FIG. 4 illustrates one example of a device 400 for ionospheric threat mitigation for precision approach and landing, various changes may be made to FIG. 4. For example, computing devices and systems come in a wide variety of configurations, and FIG. 4 does not limit this disclosure to any particular computing device or system.

Figure 5:
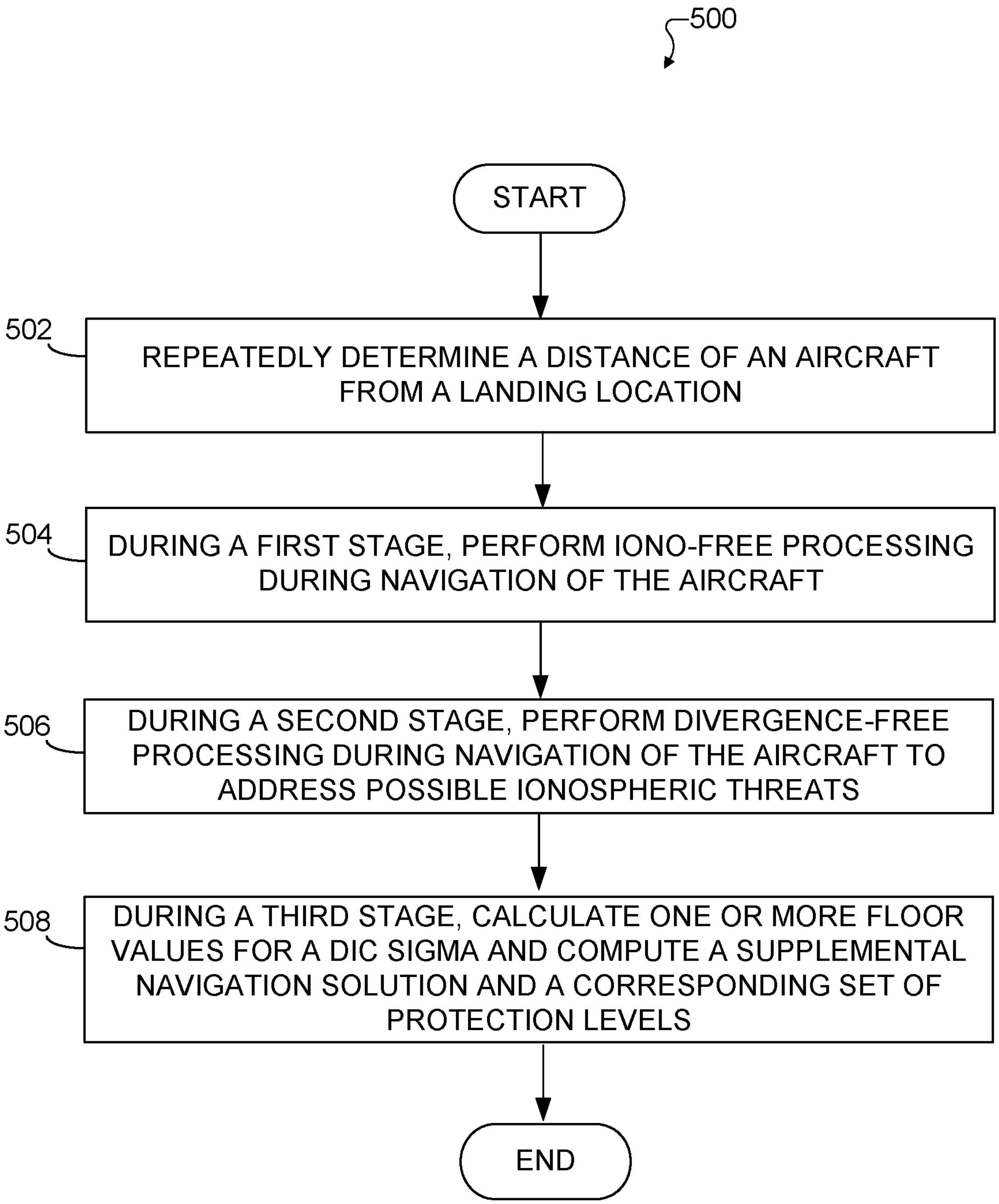
FIG. 5 illustrates an example method for ionospheric threat mitigation for precision approach and landing according to this disclosure.

FIG. 5 illustrates an example method 500 for ionospheric threat mitigation for precision approach and landing according to this disclosure. For ease of explanation, the method 500 is described as involving the process 300 of FIG. 3 and being performed using the main navigation system 134, the IGH1 monitor 130, and the spatial IGM 132 in the system 100 of FIG. 1. However, the method 500 may be used with any other suitable device or system.

As shown in FIG. 5, a distance of an aircraft from a landing location is repeatedly determined at step 502. This may include, for example, the spatial IGM 132 repeatedly determining the distance of the aircraft 128 from its landing location while the aircraft 128 makes its approach. During a first stage in which the aircraft is at least a threshold distance from the landing location, iono-free processing is performed during navigation of the aircraft at step 504. This may include, for example, the main navigation system 134 performing iono-free processing in the first stage 302.

During a second stage in which the aircraft is less than the threshold distance from the landing location and a velocity of the aircraft is greater than a velocity threshold, divergence-free processing is performed during navigation of the aircraft to address possible ionospheric threats at step 506. This may include, for example, the spatial IGM 132 performing divergence-free processing during the second stage 304. During a third stage in which the aircraft is less than the threshold distance from the landing location and the velocity of the aircraft is less than the velocity threshold, one or more floor values for a DIC sigma is calculated, and for each of multiple ionospheric hypothesized gradient threat scenarios, a supplemental navigation solution and a corresponding set of protection levels are computed at step 508. This may include, for example, the IGH1 monitor 130 calculating one or more floor values for the DIC sigma and computing a supplemental navigation solution and a corresponding set of Ionospheric H1 protection levels during the third stage 306.

Although FIG. 5 illustrates one example of a method 500 for ionospheric threat mitigation for precision approach and landing, various changes may be made to FIG. 5. For example, while shown as a series of steps, various steps shown in FIG. 5 may overlap, occur in parallel, occur in a different order, or occur multiple times. Also, some steps may be combined or removed and additional steps may be added according to particular needs.

The following describes example embodiments of this disclosure that implement or relate to ionospheric threat mitigation for precision approach and landing. However, other embodiments may be used in accordance with the teachings of this disclosure.

In a first embodiment, a method includes repeatedly determining a distance of an aircraft from a landing location. The method also includes, during a first stage in which the aircraft is at least a threshold distance from the landing location, performing iono-free processing during navigation of the aircraft. The method further includes, during a second stage in which the aircraft is less than the threshold distance from the landing location and a velocity of the aircraft is greater than a velocity threshold, performing divergence-free processing during navigation of the aircraft to address possible ionospheric threats. In addition, the method includes, during a third stage in which the aircraft is less than the threshold distance from the landing location and the velocity of the aircraft is less than the velocity threshold, calculating one or more floor values for a Differential Ionospheric Correction (DIC) sigma, and using the one or more floor values to determine a navigation solution that protects against threats due to nominal ionospheric conditions.

In a second embodiment, a device includes at least one processor configured to repeatedly determine a distance of an aircraft from a landing location. The at least one processor is also configured, during a first stage in which the aircraft is at least a threshold distance from the landing location, to perform iono-free processing during navigation of the aircraft. The at least one processor is further configured, during a second stage in which the aircraft is less than the threshold distance from the landing location and a velocity of the aircraft is greater than a velocity threshold, to perform divergence-free processing during navigation of the aircraft to address possible ionospheric threats. In addition, the at least one processor is configured, during a third stage in which the aircraft is less than the threshold distance from the landing location and the velocity of the aircraft is less than the velocity threshold, to calculate one or more floor values for a DIC sigma, and use the one or more floor values to determine a navigation solution that protects against threats due to nominal ionospheric conditions.

In a third embodiment, a non-transitory computer readable medium contains instructions that when executed cause at least one processor to repeatedly determine a distance of an aircraft from a landing location. The medium also contains instructions that when executed cause the at least one processor, during a first stage in which the aircraft is at least a threshold distance from the landing location, to perform iono-free processing during navigation of the aircraft. The medium further contains instructions that when executed cause the at least one processor, during a second stage in which the aircraft is less than the threshold distance from the landing location and a velocity of the aircraft is greater than a velocity threshold, to perform divergence-free processing during navigation of the aircraft to address possible ionospheric threats. In addition, the medium contains instructions that when executed cause the at least one processor, during a third stage in which the aircraft is less than the threshold distance from the landing location and the velocity of the aircraft is less than the velocity threshold, to calculate one or more floor values for a DIC sigma, and use the one or more floor values to determine a navigation solution that protects against threats due to nominal ionospheric conditions.

Any single one or any suitable combination of the following features may be used with the first, second, or third embodiment. IGH1 calculations can be performed to determine a set of protection levels that protect the navigation solution against threats from non-nominal ionospheric conditions. The velocity threshold can comprise a minimum aircraft velocity to observe a spatial ionospheric gradient. Performing the iono-free processing can comprise calculating iono-free pseudo-range observables and iono-free carrier phase observables using raw pseudo-range and carrier phase measurements from one or more reference Global Navigation Satellite System (GNSS) receivers. Performing the divergence-free processing can comprise selecting a buffer sample rate and a buffer size based on the velocity of the aircraft and a minimum distance over which a spatial ionospheric gradient is observable, wherein the buffer sample rate and the buffer size are associated with a data buffer for one or more system reference and aircraft ionosphere measurements. The buffer sample rate and the buffer size can be selected to satisfy the following equation:

$$\text{Relative\_aircraft\_velocity}*\text{Buffer\_Sample\_Rate}*\text{Buffer\_Size}=D,$$

where Relative_aircraft_velocity is the velocity of the aircraft, Buffer_Sample_Rate is the selected buffer sample rate, Buffer_Size is the selected buffer size, and D is the minimum distance over which the spatial ionospheric gradient is observable. The buffer sample rate can be selected to be a multiple of a data rate processing speed. During the third stage, for each of multiple ionospheric hypothesized gradient threat scenarios, a supplemental navigation solution and a corresponding set of protection levels can be computed.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present disclosure should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:

repeatedly determining a distance of an aircraft from a landing location;

during a first stage in which the aircraft is at least a threshold distance from the landing location, performing iono-free processing during navigation of the aircraft;

during a second stage in which the aircraft is less than the threshold distance from the landing location and a velocity of the aircraft is greater than a velocity threshold, performing divergence-free processing during navigation of the aircraft to address possible ionospheric threats; and during a third stage in which the aircraft is less than the threshold distance from the landing location and the velocity of the aircraft is less than the velocity threshold, calculating one or more floor values for a Differential Ionospheric Correction (DIC) sigma, and using the one or more floor values to determine a navigation solution that protects against threats due to nominal ionospheric conditions.

2. The method of claim 1, further comprising:

during the third stage, performing Ionospheric Gradient H1 (IGH1) calculations to determine a set of protection levels that protect the navigation solution against threats from non-nominal ionospheric conditions.

3. The method of claim 1, wherein the velocity threshold comprises a minimum aircraft velocity to observe a spatial ionospheric gradient.

4. The method of claim 1, wherein performing the iono-free processing comprises:

calculating iono-free pseudo-range observables and iono-free carrier phase observables using raw pseudo-range and carrier phase measurements from one or more reference Global Navigation Satellite System (GNSS) receivers.

5. The method of claim 1, wherein performing the divergence-free processing comprises:

selecting a buffer sample rate and a buffer size based on the velocity of the aircraft and a minimum distance over which a spatial ionospheric gradient is observable, wherein the buffer sample rate and the buffer size are associated with a data buffer for one or more system reference and aircraft ionosphere measurements.

6. The method of claim 5, wherein the buffer sample rate and the buffer size are selected to satisfy the following equation:

Relative_aircraft_velocity*Buffer_Sample_Rate*Buffer_Size=*D*, wherein Relative_aircraft_velocity is the velocity of the aircraft, Buffer_Sample_Rate is the selected buffer sample rate, Buffer_Size is the selected buffer size, and D is the minimum distance over which the spatial ionospheric gradient is observable.

7. The method of claim 5, wherein the buffer sample rate is selected to be a multiple of a data rate processing speed.

8. A device comprising:

at least one processor configured to:

repeatedly determine a distance of an aircraft from a landing location;

during a first stage in which the aircraft is at least a threshold distance from the landing location, perform iono-free processing during navigation of the aircraft;

during a second stage in which the aircraft is less than the threshold distance from the landing location and a velocity of the aircraft is greater than a velocity threshold, perform divergence-free processing during navigation of the aircraft to address possible ionospheric threats; and during a third stage in which the aircraft is less than the threshold distance from the landing location and the velocity of the aircraft is less than the velocity threshold, calculate one or more floor values for a Differential Ionospheric Correction (DIC) sigma, and use the one or more floor values to determine a navigation solution that protects against threats due to nominal ionospheric conditions.

9. The device of claim 8, wherein the at least one processor is further configured to:

during the third stage, perform Ionospheric Gradient H1 (IGH1) calculations to determine a set of protection levels that protect the navigation solution against threats from non-nominal ionospheric conditions.

10. The device of claim 8, wherein the velocity threshold comprises a minimum aircraft velocity to observe a spatial ionospheric gradient.

11. The device of claim 8, wherein, to perform the iono-free processing, the at least one processor is configured to:

calculate iono-free pseudo-range observables and iono-free carrier phase observables using raw pseudo-range and carrier phase measurements from one or more reference Global Navigation Satellite System (GNSS) receivers.

12. The device of claim 8, wherein, to perform the divergence-free processing, the at least one processor is configured to:

select a buffer sample rate and a buffer size based on the velocity of the aircraft and a minimum distance over which a spatial ionospheric gradient is observable, wherein the buffer sample rate and the buffer size are associated with a data buffer for one or more system reference and aircraft ionosphere measurements.

13. The device of claim 12, wherein the at least one processor is configured to select the buffer sample rate and the buffer size to satisfy the following equation:

Relative_aircraft_velocity*Buffer_Sample_Rate*Buffer_Size=*D*, wherein Relative_aircraft_velocity is the velocity of the aircraft, Buffer_Sample_Rate is the selected buffer sample rate, Buffer_Size is the selected buffer size, and D is the minimum distance over which the spatial ionospheric gradient is observable.

14. The device of claim 12, wherein the at least one processor is configured to select the buffer sample rate to be a multiple of a data rate processing speed.

15. A non-transitory computer readable medium containing instructions that when executed cause at least one processor to:

repeatedly determine a distance of an aircraft from a landing location;

during a first stage in which the aircraft is at least a threshold distance from the landing location, perform iono-free processing during navigation of the aircraft;

during a second stage in which the aircraft is less than the threshold distance from the landing location and a velocity of the aircraft is greater than a velocity threshold, perform divergence-free processing during navigation of the aircraft to address possible ionospheric threats; and during a third stage in which the aircraft is less than the threshold distance from the landing location and the velocity of the aircraft is less than the velocity threshold, calculate one or more floor values for a Differential Ionospheric Correction (DIC) sigma, and use the one or more floor values to determine a navigation solution that protects against threats due to nominal ionospheric conditions.

16. The non-transitory computer readable medium of claim 15, wherein the medium contains instructions that when executed cause the at least one processor to:

during the third stage, perform Ionospheric Gradient H1 (IGH1) calculations to determine a set of protection levels that protect the navigation solution against threats from non-nominal ionospheric conditions.

17. The non-transitory computer readable medium of claim 15, wherein the velocity threshold comprises a minimum aircraft velocity to observe a spatial ionospheric gradient.

18. The non-transitory computer readable medium of claim 15, wherein the instructions that when executed cause the at least one processor to perform the iono-free processing comprise:

instructions that when executed cause the at least one processor to calculate iono-free pseudo-range observables and iono-free carrier phase observables using raw pseudo-range and carrier phase measurements from one or more reference Global Navigation Satellite System (GNSS) receivers.

19. The non-transitory computer readable medium of claim 15, wherein the instructions that when executed cause the at least one processor to perform the divergence-free processing comprise:

instructions that when executed cause the at least one processor to select a buffer sample rate and a buffer size based on the velocity of the aircraft and a minimum distance over which a spatial ionospheric gradient is observable, wherein the buffer sample rate and the buffer size are associated with a data buffer for one or more system reference and aircraft ionosphere measurements.

20. The non-transitory computer readable medium of claim 19, wherein the instructions when executed cause the at least one processor to select the buffer sample rate and the buffer size to satisfy the following equation:

$$\text{Relative\_aircraft\_velocity}*\text{Buffer\_Sample\_Rate}*\text{Buffer\_Size}=D,$$

wherein Relative_aircraft_velocity is the velocity of the aircraft, Buffer_Sample_Rate is the selected buffer sample rate, Buffer_Size is the selected buffer size, and D is the minimum distance over which the spatial ionospheric gradient is observable.

* * * * *